Patented Nov. 24, 1953

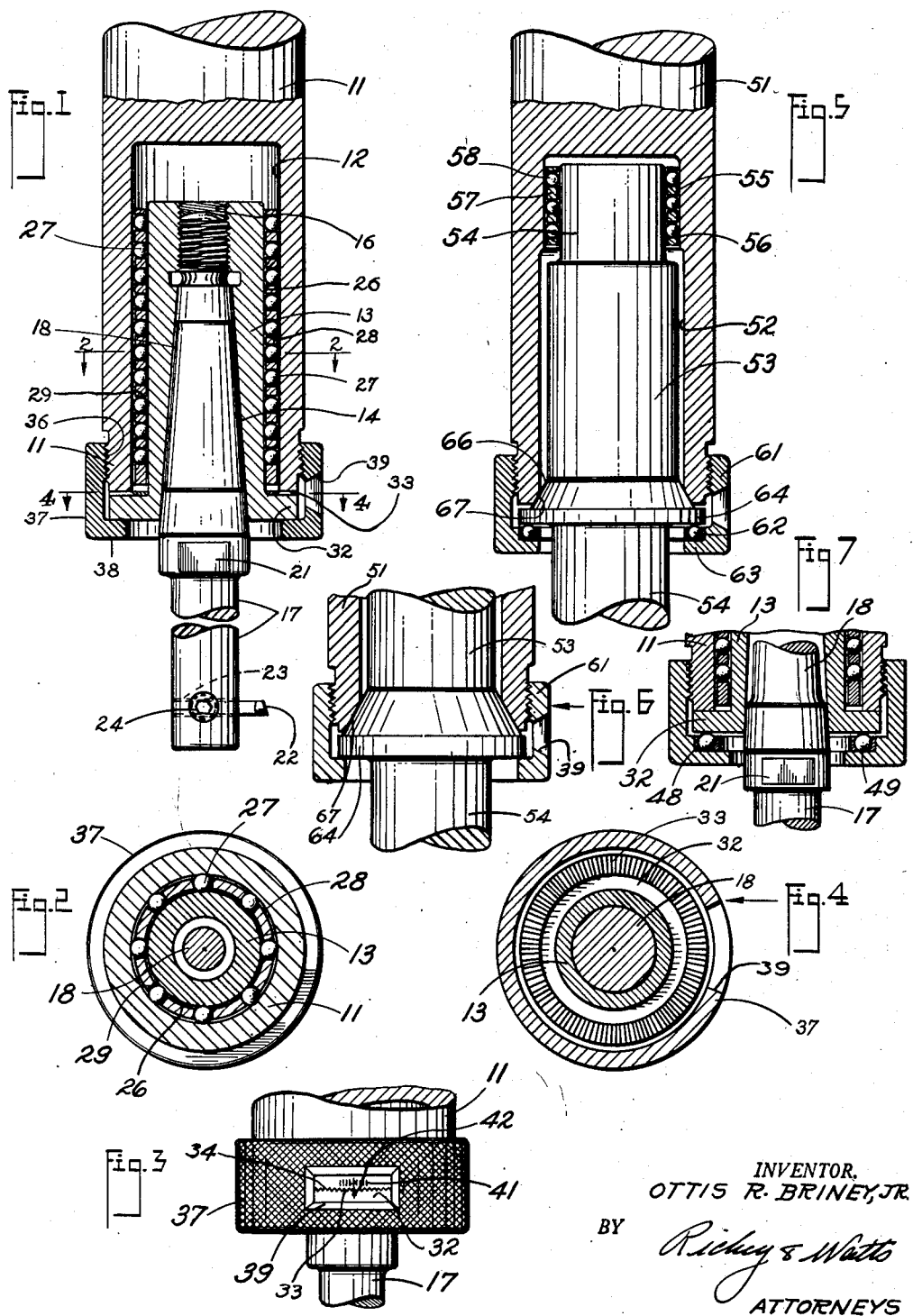

2,660,463

UNITED STATES PATENT OFFICE 2,660,463

ADJUSTABLE COUPLING

Ottis R. Briney, Jr., Pontiac, Mich., assignor of one-half to James W. Briney

Application October 28, 1948, Serial No. 56,968

2 Claims. (Cl. 287—119)

This invention relates broadly to adjustable couplings and, more specifically, to mechanisms to facilitate rotative adjustments of a cylindrical part supported in a sleeve in the order of a press-fit engagement.

In the embodiment illustrated the invention is employed as a holder for a boring tool or the like, the spindle being formed with an eccentric bore to accommodate transaxial adjustments of the boring bar in order to vary the radius of the cut. It will be apparent, however, that the present invention may be employed in other applications where it is desired to connect two aligned members without lost motion and yet facilitate the ready adjustment of the parts by the rotation of one relative to the other.

The invention is particularly suited to mechanisms that require minute lateral adjustments, but is not restricted to such applications.

The principal objects of the invention are to provide mechanism in which two parts of a machine or the like may be rotatively adjusted relative to each other with great ease and precision; to provide an adjustable coupling in which the parts are united without lost motion; to provide a coupling which will accommodate adjustments with ease and dispatch; and to provide a spindle, boring bar, or the like for a machine tool which may be readily adjusted laterally of the spindle and still support the parts in rigid assembly.

The manner in which the objects of the invention are realized and the principles and advantages thereof will be apparent to those skilled in the art from the description herein of preferred embodiments of the invention.

Referring to the drawings:

Fig. 1 is a longitudinal section of a spindle, having a rotatable longitudinally movable socket therein and a boring bar mounted in place in the socket;

Fig. 2 is a transverse section of the same on the plane indicated in Fig. 1;

Fig. 3 is a partial side elevational view of a fragmentary portion thereof;

Fig. 4 is a transverse section of the device of Fig. 1 taken on a plane indicated by the line 4—4 in Fig. 1;

Fig. 5 is a longitudinal section of a modification of the device illustrated in Fig. 1;

Fig. 6 is a sectional view of a fragmentary portion of a modification of the device illustrated in Fig. 5; and Fig. 7 is a vertical sectional view of a modification of the device illustrated in Fig. 1.

By way of introduction to the full description of preferred embodiments of the invention, it may be stated that these embodiments all involve the support of a boring bar mounted eccentrically in the spindle of a machine tool. Thus, by rotating the eccentric part, the cutting radius of the boring tool may be varied. The invention involves the use of ball bearings mounted without clearance to support the part within the eccentric bore in the spindle, such structure permitting free rotation of the parts for adjustment and eliminating the clearance necessarily employed in plain telescopic bearings.

This principle is exemplified in the apparatus of Fig. 1, in which 11 represents a rotatable spindle of a boring machine, although it obviously could be a non-rotatable bar mounted in the tool holder of a turret lathe. In any case, the part 11 is considered to be in fixed relation with the axis about which turning is to take place, insofar as transverse movement is concerned, although movement of the part 11 longitudinally of the axis of the generated surface may be provided.

Assuming, however, for conciseness, that the part 11 is the spindle of a boring machine, the end of the spindle is bored slightly eccentric to provide a cylindrical cavity 12 which is parallel to the axis of the spindle. A socket or adapter 13 for a boring bar shank or the like is supported within the chamber 12 by any suitable means. The adapter may be designed for the retention of any desired type of boring bar or other instrument but, for purposes of illustration, is shown herein with a tapered central bore 14 terminating in a tapped opening 16 for the reception of the threaded end of a boring bar 17 having a tapered shank 18. The boring bar may be formed with flat areas 21 for the reception of a wrench to tighten the bar in the socket. The arrangement shown herein for mounting the boring bar in the adapter is conventional, and other arrangements providing for accurate and firm retention of the boring bar may be employed. The boring bar may be formed in any suitable manner to support the cutting tool, as, for example, the fly cutter 22 in a transverse opening 23 in the bar 17.

Considering now the means by which the adapter 13 is adjustably supported in the spindle 11, the adapter is formed with a cylindrical outer surface 26 which is engaged with a plurality of bearing balls 27 supported in a ball separator 28. The inner surface of the bore 12 and the outer surface 26 of the adapter are hardened, ground, and lapped to form accurate cylindrical bearing races. The radial dimension between these races is not more than the diameter of the balls 27, the balls being preferably impinged between the races in the order of a tight press-fit. The adapter 13 is thus supported at a multiplicity of points by the balls 27 which, being without clearance, positively align the axis of the adapter with the axis of the bore 12.

The balls 27 are mounted in the cage or separator means 28 in any convenient array such as a helical pattern or a number of circular patterns which may be staggered. The general construction of the separator 28 may be as described in my U. S. Patent No. 2,311,815, issued February 23, 1943, in which the retainer is a cylindrical shell dimensioned to eliminate clearance between the balls and races. The separator assembly is formed by holes 29 drilled in the separator so that the body of the drill does not completely penetrate the wall, leaving a lip at one end of each hole to prevent the balls from dropping out when the separator is removed from the bearing. After the balls are inserted, the other end of each hole is peened or otherwise constricted to confine the balls.

The outer end of the adapter 13 is formed with a flange 32, the inner face of which is finely serrated at 33 to cooperate with matching serrations 34 on the outer end face of the spindle 11. The spindle is externally threaded at 36 for a locking collar 37, the flange 38 of which engages the outer face of the flange 32 of the adapter. The locking collar 37 is intended to be tightened by hand and may be knurled if desired. It may be provided with an opening 39 constituting a window through which graduations 41 on the outer margin of the flange 32 may be read against one or a plurality of indices 42 on the spindle.

Since the bore 12 is off center in the spindle 11, the cutting radius of the tool 22 may be varied by rotating the adapter relative to the spindle. The amount of eccentricity is dependent upon the desired range and sensitivity of adjustment. By way of example, an eccentricity of five thousandths of an inch would provide a total tool adjustment of one hundredth of an inch. Rough adjustment of the tool may, of course, be effected by resetting the tool in the boring bar.

In order to adjust the tool, the locking collar 37 is partly unscrewed so as to release the serrations 33 of the adapter from the serrations 34 of the spindle. Axial movement of the adapter with respect to the spindle to free the serrations is freely permitted by rotation of the balls. The adapter 13 may then be rotated to any desired extent by rotating the boring bar 17 by hand; thereafter, the collar 37 is tightened to re-engage the serrations.

It is important to bear in mind that the fit of the bearing balls in the two races may be the equivalent of a press-fit and yet both rotary and reciprocative movement of the adapter in the spindle is entirely free so that there is no resistance tending to hamper close adjustment through small angles. In assembling the adapter in the socket 12, the ball separator is inserted half its length in the socket and the adapter is inserted into the protruding half of the separator. The adapter may then be pushed into the socket, the balls rolling inwardly and translating the separator without any significant resistance. If, however, the cage or separator is inserted in the hole to the bottom thereof, or to engage the flange 32 of the adapter before it is fully inserted, it will be impossible with normal manual exertion to complete the assembly. This effect illustrated the ease of adjustment that may be obtained and the tightness of the fit provided by the structure.

Fig. 7 illustrates a modified construction which may be the same in all respects as that previously described save as to the organization of the locking means. The engaging shoulders of the adapter 32 and the end face of the spindle are smooth, the serrations 33 and 34 of Fig. 1 being omitted. An anti-friction thrust bearing is preferably provided between the flanges 32 and 38, which comprises a ball cage or separator ring 48 and bearing balls 49. The manner of mounting the balls 49 in the ring may be the same as that above described for the separator 28. The operation of this form of the invention is the same as that of the form of Fig. 1 except that the adapter may be locked in any angular relation to the spindle. Greater flexibility of adjustment results from this feature. On the other hand, however, the torque, due to the cutting action of the tool, is resisted by friction only, and not by the positive engagement of the serrations. Either form may be preferable under certain conditions.

The thrust bearing is considered desirable to increase the ease of tightening and loosening the locking ring by hand and also to eliminate any possibility of rotation of the adapter caused by friction between the locking ring and the adapter. This arrangement is not essential, however, since if the area of the bearing between the locking ring and the flange 32 is less than the area of contact between the flange 32 and the spindle, greater friction will be obtained between the adapter and the spindle and the locking ring will not upset the adjustment.

The species of the invention illustrated in Fig. 5 is distinguished from those previously described in that the boring bar is mounted directly in the spindle and the adapter is eliminated. Another distinction of this species over those previously described is that the anti-friction bearing provides a part only of the support for the adjustable member, the remaining support being provided by a conical bearing seat and cone. Considering the species of Fig. 5 in detail, the member 51 may correspond to the spindle 11 of Fig. 1 and is machined to form a slightly eccentric cavity 52 of circular cross section within which a body 53 is mounted for rotation. The body 53 is formed with an extension 54 projecting from the end of the spindle 51 which constitutes a boring bar and on which a cutting tool may be mounted in any desired manner, as, for example, the manner illustrated in Fig. 1. The inmost portions of the cavity 52 and the bar 53 are hardened, ground, and lapped to provide cylindrical anti-friction bearing surfaces or races 55 and 56 thereon, respectively. A bearing comprising a separator 57 and balls 58 is fitted between the races 54 and 56 with a press or clearanceless type of fit, as described in connection with the preceding forms. The retainer 57 is designed for only a relatively small number of circumferential rows of balls, such as three, and need extend only a relatively small part of the length of the cavity 52. The balls 58 are thus relied upon to maintain the alignment of the inner end of the bar 53 within the cavity 52, but not to align the outer end against working loads. The spindle 51 is provided with a locking ring 61 which may be identical with that of Fig. 1 or with that of Fig. 3, as illustrated, in which case an anti-friction bearing 62 acts as a thrust bearing between the flange 63 of the locking ring and the flange 64 of the bar. Adjacent the flange 64 the bar 53 is formed with a conical shoulder 66 which engages a conical seat 67 at the mouth of the cavity 52. The surfaces 66 and 67 are accurately machined and lapped so that concentricity of the bar and seat regardless of rotation thereof is assured.

It will be apparent from the above that the anti-friction bearing 57, 58 maintains the alignment of the bearing 53 and its support at the end of the bar and the inter-engaging conical surfaces 66 and 67 maintain the alignment at a point spaced axially from the anti-friction bearing. Since the anti-friction bearing permits axial movement, it does not interfere with the proper engagement of the conical shoulder 66 with the spindle. By slightly unscrewing the collar 61, the bar is released for rotation, the taper of the surface 67 being considerably steeper than a freezing taper and preferably tapering about one part in two. In the form of Fig. 6 the thrust bearing has been omitted but in this embodiment, as well as those previously described, accurate alignment will be attained while retaining ease of adjustment.

As known to those skilled in the metal-working arts, if the bar 54 or adapter 13 were tightly fitted in the spindle with plain bearing surfaces to eliminate the possibility of side play and secure rigid alignment, it would be impossible to insert the parts manually or to rotate these parts relative to each other. There would, in other words, be a press-fit between the two parts which would render any rotatable adjustment impossible. By the use of the clearanceless type of ball bearing described to align and support the entire structure or align and support one end thereof, all the advantages of a press-fit insofar as rigidity and constancy of alignment are concerned are retained, and with them the ease of adjustment of a comparatively loose fit.

The part 51 may or may not be an actual spindle. It may be mounted on a spindle, or, for example, in the turret head of a screw machine.

Obviously, the form of structure illustrated in Fig. 5 could be utilized in an adapter for a tool as is illustrated in Fig. 1, or, in other words, the body 53 could be formed with a socket for the reception of a tool shank in the manner illustrated by the adapter 13 in Fig. 1, or by any other suitable arrangement.

It is believed that the foregoing detailed description of preferred embodiments of the invention will make clear the principles and advantages of the invention and make evident the fact that the valuable properties of the invention may be advantageously realized in many situations in which an adjustable coupling between two parts is desired. Insofar as this aspect of the invention is concerned, the embodiments described herein may be regarded as illustrative of many possible uses therefor. However, the adjustable coupling is particularly adapted for and particularly desirable in the combination of a machine tool spindle or the like and a tool so as to provide for minute adjustment of the tool. This will be apparent from consideration of prior efforts to solve this problem which have resulted ordinarily in structures which, though complicated and expensive, have exhibited backlash and other departures from accuracy.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. An adjustable coupling comprising two rotatively adjustable members, cylindrical bearing races on the members, a ball bearing without clearance comprising the said races and a plurality of bearing balls therebetween, cage means for said balls maintaining them spaced circumferentially and axially of the races, whereby the races are maintained in axial alignment, thrust bearing surfaces on the members, and means for clamping the thrust bearing surfaces into engagement, the thrust bearing surfaces being serrated.

2. An adjustable coupling comprising a first member defining an axis with a cavity formed therein eccentric to the axis, at least part of the peripheral wall of the cavity constituting a cylindrical bearing race, a second member extending into the cavity and formed with a cylindrical bearing race thereon, the two races being concentric, a plurality of bearing balls, a separator maintaining the balls in cylindrical array between the races, the diameter of the balls being at least equal to the clearance between the races, and means for locking the members against relative displacement comprising means defining serrated shoulders on the members, means for compressing the shoulders together, and anti-friction thrust bearing means between the compressing means and one of the members.

OTTIS R. BRINEY, Jr.

References Cited in the file of this patent

UNITED STATES PATENTS

| Number | Name | Date |
| --- | --- | --- |
| 1,174,309 | Clermont | Mar. 7, 1916 |
| 1,485,904 | Bellinger | Mar. 4, 1924 |
| 2,110,537 | Tautz | Mar. 8, 1938 |
| 2,297,064 | McKinley | Sept. 29, 1942 |
| 2,311,815 | Briney | Feb. 23, 1943 |
| 2,359,859 | Jarvis | Oct. 10, 1944 |
| 2,459,416 | Davis | Jan. 18, 1949 |
| 2,558,815 | Briney | July 3, 1951 |

FOREIGN PATENTS

| Number | Country | Date |
| --- | --- | --- |
| 48,779 | Sweden | Oct. 1, 1918 |